July 26, 1966  H. EBNER  3,262,252
APPARATUS FOR SEPARATING GAS FROM FOAM
Filed July 17, 1961  3 Sheets-Sheet 2

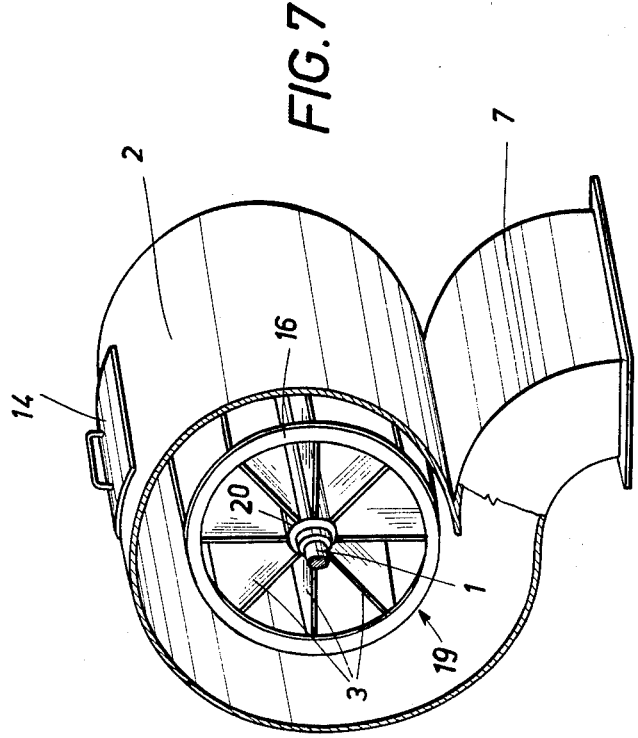
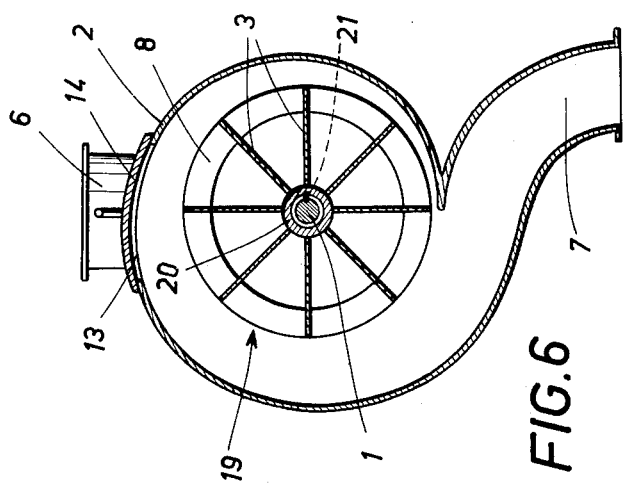

United States Patent Office 3,262,252
Patented July 26, 1966

3,262,252
APPARATUS FOR SEPARATING GAS FROM FOAM
Heinrich Ebner, 12 Oberfeldstrasse,
Linz (Danube), Austria
Filed July 17, 1961, Ser. No. 124,684
6 Claims. (Cl. 55—178)

Reference is made to my co-pending application filed in the U.S. Patent Office in my name under Serial No. 772,754 on November 10, 1958, of which this is a continuation-in-part, and which is now abandoned.

This invention relates to a foam breaker for separating gas from foam.

The formation of foam in chemical processes, for example in fermentation processes, often causes considerable difficulties in operating the apparatus for carrying out such processes in a satisfactory manner. Chemical antifoaming substances and mechanical foam breakers have been suggested previously in many variations, but the results obtainable by these previous suggestions were limited and not satisfactory. This was usually due to the fact that the foams formed in various processes and under varying conditions, differ in their structure which depends particularly upon the proportion of liquid and gas in the foam and this proportion can vary within wide limits. Thus, heretofore it has been practically impossible to break up by the same apparatus a so-called "dry foam" which is poor in liquid and a so-called "wet" foam which is rich in liquid. This is of special importance in foam breakers for fermentation processes, in which relatively small changes in the reaction conditions during fermentation may cause distinct differences in the characteristics of the foam produced.

It is, therefore, a main object of the present invention to provide an apparatus which will act on foam of any type in substantially equally effective manner, i.e., regardless of the character of the foam. Every type of foam contains foam particles which can easily be separated into gas and liquid by centrifugal force and also foam particles which strongly resist such separation. The ratio of these two kinds of particles in the foam characterizes the foam as "wet" or "dry" and this ratio depends primarily upon compounds which influence the surface tension of the liquid, from which the foam is formed. Other objects and the advantages of the invention will be apparent from the appended drawings and the following specification and claims.

I have now discovered that the difficulties encountered in the hitherto suggested foam breaking processes and apparatus can be avoided and any type of foam can be satisfactorily separated into gas and liquid by proceeding as follows.

According to my invention, foam is introduced into a device of my invention in an amount which contains more gas than the amount of gas introduced into and distributed in the foam-forming liquid per unit of time. Said amount of foam is then subjected in said device to partial splitting by centrifugal action in such manner that a volume of gas which is substantially equal to the gas supplied to the foam-forming liquid, is separated from the foam and escapes from said device per unit of time. The liquid thus separated from gas and the unseparated foam are reintroduced into a lower layer of the foam-forming liquid in the manner described in more detail hereinafter.

The device for carrying out my invention is adapted to be connected with the top of a container for the foam-forming liquid and the foam and comprises a rotor secured to a rotatable shaft and provided with radial blades which act centrifugally on foam introduced into the rotor in axial direction. The shaft and rotor are eccentrically arranged in a cylindrical housing which has at one of its end surfaces a foam inlet opening coaxial with the shaft, for the supply to the rotor of foam in axial direction; on its opposite end surface an outlet opening coaxial with the shaft, for the escape of gas separated from foam and a foam and liquid outlet opening located at a peripheral housing part which is remotest from the shaft. A foam inlet pipe is connected to the foam inlet opening in the housing and can be connected with the upper part of the container for liquid and foam. A gas outlet pipe is connected to the gas outlet opening in the housing and a foam and liquid return pipe is connected to the foam and liquid outlet opening in the housing for passing the unseparated foam and the liquid separated from the foam, into the lower half of the container. It is preferable that the foam inlet pipe as well as the air or gas outlet pipe beginning at the housing opening, shall have a bent portion therein of approximately 90° with a quadrangular or circular cross section adjacent the rotary member and turning to a rectangular or oval cross section within the bent with the short axis extending in the direction of the shaft of the rotary member.

The appended drawings illustrate by way of example and without limitation some specific embodiments of and best modes for carrying out the invention.

In the appended drawings:

FIGURE 6 is a vertical cross section of a modified embodiment of the apparatus of the invention, and FIGURE 7 is a perspective view of said embodiment shown in FIG. 6.

Figure 1:
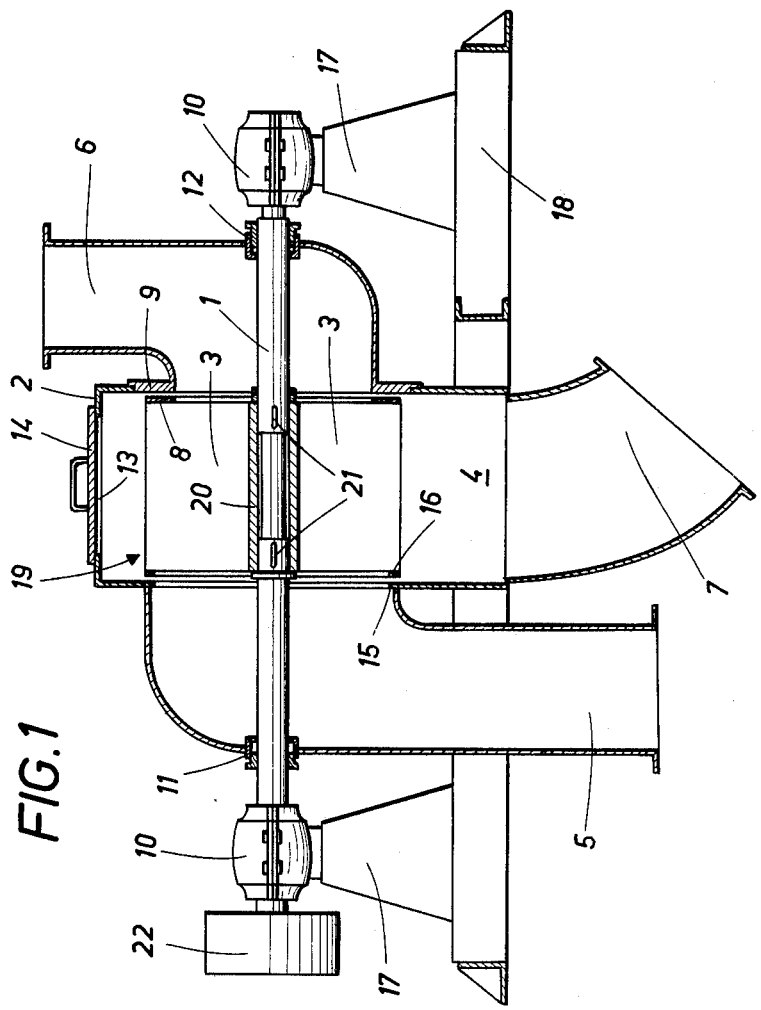
FIGURE 1 is a vertical longitudinal section of an embodiment of the apparatus.
Figure 2:
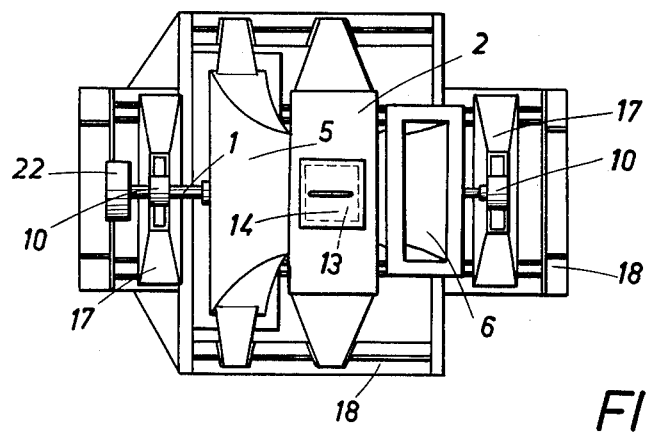
FIGURE 2 is a plan view of the apparatus shown in FIG. 1 on a somewhat smaller scale.
Figure 4:
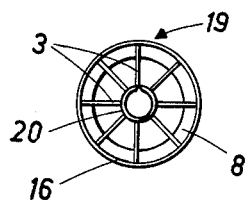
FIGURE 4 is a front elevation of the rotary member, of the apparatus shown in FIG. 1.
Figure 3:
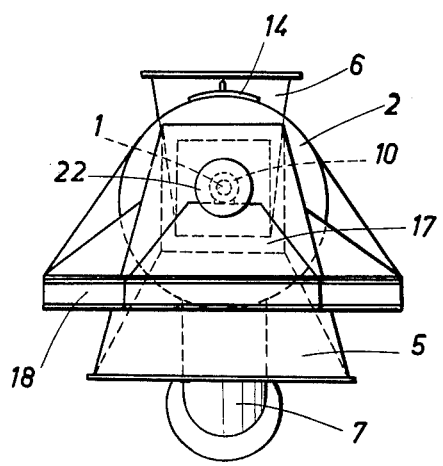
FIGURE 3 is a side view of said apparatus on a somewhat smaller scale.
Figure 5:
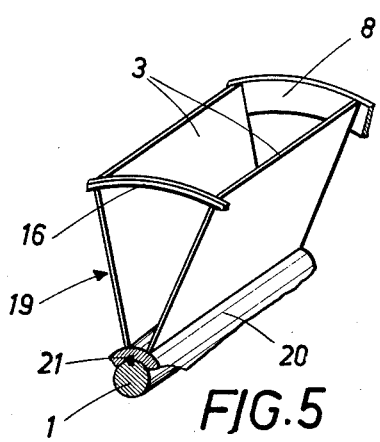
FIGURE 5 is a perspective view partly in section of a part of the rotary member of FIG. 4.

Referring now to the drawings in detail, FIGURE 1 shows a shaft 1 which is horizontally mounted in bearings 10 with the latter mounted on suitable uprights 17 on a base frame 18. A rotary member 19 is mounted to rotate with the shaft 1 by means of a hub 20 interconnected to the shaft by keys 21. The rotary member 19 is provided with a plurality of spaced vanes or paddles 3 radially arranged and secured on the hub 20 as clearly shown in FIG. 5. A cylindrical housing 2 of circular cross-section perpendicularly to the cylinder axis surrounds the rotary member 19 and the length of the radial wings or vanes 3 in the axial direction of the shaft is greater than the width of the vanes in the radial direction. The axial length of the vanes can be from 1.1 to 3 times the radial width. When the vanes 3, as shown in FIGS. 1 and 5 each have right angle peripheral ends then the relationship can be 1.5 to 1. The rotary member 19 preferably has at least eight radial vanes or blades and such blades 3 are interconnected at one peripheral edge which is the foam entry end, by a circular ring 16 which strengthens the rotor.

On the housing or casing 2 there is provided on one side, FIG. 1, a foam inlet opening which is coaxial with shaft 1 and is connected with a foam inlet pipe 5. On the opposite side of the casing 2 there is a gas or air outlet opening which is likewise coaxial with shaft 1 and is connected with gas outlet pipe 6. On the bottom of the casing 2 there is a foam and liquid outlet opening connected with conduit 7 at 4 to convey away the centrifugally separated fluid and the unseparated foam to the lower half of the container (not shown) for liquid and the foam formed from this liquid. The rotary member 19 is provided with a flat ring 8 on the outlet side, FIG. 1 on the peripheral side end of the rotor and this ring 8 is adjacent a flange 9 on the outlet pipe 6 with a very small amount of clearance of 0.5–2 mm. between the parts 8 and 9. The rings 8 and 9 have the same internal diameters. The interior surface of said flange and the exterior surface of the flat ring are faced or turned. The cross section of the lower pipe 7 for the return of the centrifuged fluid is larger than 40% of the foam inlet opening for the rotary member. The sum of the cross sections of the gas outlet pipe 6 and of the foam or fluid return pipe 7 is larger or at least as large as the cross section of the foam inlet opening of the rotary member 19. The rotary member 19 is eccentrically arranged in the housing 2 and the conduit 7 is connected to the lower part of the casing at 4, i.e., at that part of the cylindrical housing 2, which is at the greatest distance from shaft 1. Pipe 7 is connected with an extension for leading the reflux liquid and foam into the lower half of the container for the foam-forming liquid. The shaft 1 of the rotary member 19, on the outside of the housing 2, is mounted in bearings 10 and extends through the foam inlet pipe at 11 which is a stuffing box and through the gas outlet pipe 6 at the stuffing box 12. In order to reduce the distance of the two stuffing bushings or boxes 11 and 12 and of the bearings 10 the foam inlet pipe 5 as well as the gas outlet pipe 6 are provided each with a 90° angle a short distance from the housing. The opening of each pipe may be quadrangular in cross section adjacent the rotary member and turning to rectangular cross section within the 90° angles. A circular flange 15, which is quadrangular on its outside, forces the foam into the rotary member. At the gas outlet side there is a flange 9 which is quadrangular on the outside while on the inside it has a circular opening of the same inner diameter as the flat ring 8 for the gas outlet.

The housing 2 is provided with a cover 14 closing a cleaning opening 13. The shaft 1 may be driven by an electric motor, not shown, or by a pulley wheel 22 or it may be coupled directly to a transmission, or some other suitable motive source of power may be used.

The foam and liquid outlet opening, to which the conduit 7 is connected, is preferably formed by two generatrices of the cylindrical housing, which are spaced from each other and parts of the two end surfaces of the housing.

FIGURES 6 and 7 illustrate a modified embodiment of the apparatus according to the invention, in which the housing 2 has a spiral cross-section. The other parts of the apparatus according to this embodiment are the same as in the embodiment shown in FIG. 1, but the end surfaces of the spiral housing and the parts connected with said end surfaces are not shown in FIG. 7. Reference symbol 7 in FIG. 7 indicates the return conduit for liquid separated from gas and unseparated foam which are guided by conduit 7 from the housing into the lower half, preferably near the bottom, of the container for the foam-forming liquid and foam. The foam and liquid outlet opening of the spiral housing is formed by the starting and terminal longitudinal edges of the housing and parts of the two end surfaces thereof.

It has been found that by the above described apparatus it is possible to separate and let escape the amount of gas which is blown into a container filled with liquid and foam, without the gas dragging along foam and with a small power consumption. The simple blades used in the apparatus of the invention operate with small power consumption and the separated gas passes through the rotor without change of the axial direction of foam supply to avoid any mixing effect which may stabilize the foam instead of splitting it.

The particles radially deflected in devices according to my invention by the blades are liquid particles separated from gas and also unseparated foam particles of a higher resistance to separation and it is an important feature of the present invention to introduce this mixture of liquid and foam particles into the lower half of the container for the, e.g., aerated liquid, so that a concentration or enrichment of said resistant foam particles near the foam breaker is avoided. According to a preferred embodiment the foam and liquid return pipe 7 extends up to a level substantially directly above the bottom of said container. The effect of the heredescribed feature is shown by the following example.

A steel tank having a total capacity of 32,000 liters, a diameter of 3.00 meters, and a height of 4.50 meters is provided at the center of its bottom with a device for fine aeration according to the British Patent No. 724,791. A foam separator according to the invention which is mounted at the center of the top cover of the tank, has a rotor consisting of eight radial blades, the axial dimension of which is 180 millimeters and the radius of which is 90 millimeters. The rotor is driven at 1430 revolutions per minute by a motor by means of a V-belt. The steel tank is filled with 20,000 liters malt extract of 1° Balling and is then most finely aerated with 80 cubic meters air per hour by means of the aerating device. An extremely strong formation of foam results, which must be controlled by the foam separator.

The foam return pipe connected to 7 (according to FIG. 1 of the present application) extends from the foam separator to a point slightly spaced above the bottom of the tank so that the liquid and foam thrown off by the foam separator is returned to the tank and mixed with the liquid in the tank only in the lower part of the tank. In this arrangement an equilibrium foam pressure of 33 millimeters mercury column is reached in the tank after about 30 minutes. The foam is completely controlled by the foam separator. An amount of air equal to that blown in into the steel tank is separated from foam and discharged through the exhaust conduit 6. The equilibrium power input of the motor of the foam separator is 3.3 H.P.

In a parallel test the foam return pipe connected at 7 was shortened to two meters. The liquid and foam thrown off by the foam separator was, therefore, mixed with the tank content in the upper half of the steel tank. In this arrangement the continuously rising foam pressure reached a value of 60 millimeters mercury column in the tank after 30 minutes. The continuously increasing power input of the motor of the foam separator is at this time already 5.7 H.P. so that the experiment had to be interrupted owing to the overloading of the 4.5 H.P. motor and the danger of a foam breakthrough.

Thus, recycling of the thrown off liquid separated from gas and unseparated foam particles into the lower half of the container results in the control of difficult foams by uniform operation and with a lower power consumption, while a satisfactory operation is not possible if the recycled liquid and foam is introduced into the upper half of the container for liquid and the foam formed from it.

The higher the number of foam particles which are resistant to separation, the higher the pressure in the container, the faster the recycling and the higher the power consumption will be. Therefore, in carrying out the present invention the number of resistant foam particles at the top of the container should be kept as low as possible and this is attained by introducing the reflux of separated liquid and resistant unseparated foam particles into the lower half, preferably the lowest part, of the container. These foam particles will be, of course, forced upward in the container by the arising gas bubbles, but they are thereby distributed in the entire volume of the container and not enriched in the top layer of the container.

Because there is a certain foam pressure in the container, a pumping effect is necessary to move the reflux of liquid and unseparated foam into the container against this pressure. This pumping effect is produced by the eccentric arrangement of the rotor and its blades within the housing of circular or spiral cross-section. There is particularly in the spiral housing a counter-pressure action similar to that of a centrifugal pump and this action is capable to overcome the foam pressure present in the container for the foam-producing liquid. As described above, the foam and liquid outlet opening is always located at that peripheral part of the housing, which is at maximum distance from the eccentrically arranged shaft.

In the container for liquid and foam a slight pressure is built up by the blown-in gas, which forces the foam to enter in axial direction the blades of the rotor. If the foam contains many particles which are resistant to separation, a rather high amount of unseparated, i.e. still gas-containing, foam will be recycled and a smaller amount of gas than the blown-in volume will escape. Therefore, the pressure in the container will increase and cause a faster entry of the foam into the rotor. Pressure and recycling speed will then increase until per unit of time the volume of gas separated from the foam particles which can be split easily, becomes equal to the gas volume blown into the container. On the other hand, if, for example, during a fermentation process the number of foam particles which are resistant to separation, decreases, the recycling speed of return liquid and foam will likewise decrease automatically. The recycling is, therefore, automatically controlled if—as described above—the cross-section of the foam and liquid return pipe is large enough and does not affect the free flow of the reflux of return foam and liquid and does not retard this flow.

The shaft of the rotor may be arranged horizontally as well as vertically, or at an intermediate angle. In a horizontal arrangement of the shaft, the foam and liquid outlet opening of the housing is located at the lowest part of the housing and the foam and liquid return conduit is connected there, leading straight downward into the lower half of the container. If the shaft is arranged vertically, the foam and liquid return pipe extends from the foam and liquid outlet opening of the housing first in horizontal direction and is bent at a 90° angle within a short distance from the housing in order to pass the reflux of liquid and foam downward to the lower half of the container. The cross section of the foam and liquid return pipe should be always large enough in order to avoid retardation of the flow of the reflux even at a high recycling speed.

What is claimed is:

1. Apparatus for separating gas from foam, adapted to be connected with the top of a container for liquid and foam, comprising a rotatable shaft, a rotor secured to said shaft and being provided with radial blades for acting centrifugally on foam; a cylindrical housing having two circular end surfaces, said shaft and rotor being eccentrically arranged parallel with the axis of the cylinder in said housing, said housing having on one of its end surfaces a foam inlet opening coaxial with the shaft, for the supply to the rotor of foam in axial direction and on its opposite end surface an outlet opening coaxial with the shaft for the escape of gas separated from foam; a foam and liquid outlet opening located at a peripheral part of the housing, which is remotest from the shaft; a foam inlet pipe connected to the foam inlet opening in the housing and adapted to be connected with the upper part of the container, for said axial supply of foam to the rotor; a gas outlet pipe connected to the gas outlet opening in the housing for the escape of gas separated from foam; a foam and liquid return pipe connected to the foam and liquid outlet opening in the housing, for passing the unseparated foam and the liquid resulting from splitting foam into the lower part of the container to a level substantially directly above the bottom of the container; a flat ring provided on the rotor adjacent the gas outlet opening in the housing in order to prevent escape of foam from the rotor through the outlet opening for the gas; the housing having a flange which is located opposite the flat ring of the rotor; the interior surface of said flange and the exterior surface of the flat ring being faced and said interior surface and exterior surface being spaced 0.5–2 mm. from each other in order to prevent the escape of foam and liquid from the housing through the outlet opening for gas.

2. Apparatus as claimed in claim 1, in which the housing has a circular cross-section perpendicularly to the cylinder axis.

3. Apparatus as claimed in claim 1, in which the axial length of the radial rotor blades is greater than their radial width.

4. Apparatus as claimed in claim 1, in which the foam and liquid outlet opening is formed by two generatrices of the housing, spaced from each other and parts of the two end surfaces of the housing.

5. Apparatus for separating gas from foam, adapted to be connected with the top of a container for liquid and foam, comprising a rotatable shaft, a rotor secured to said shaft and being provided with radial blades for acting centrifugally on foam; a cylindrical housing having a spiral cross-section and two end surfaces, said shaft and rotor being eccentrically arranged parallel with the cylinder axis, in said housing; said housing having on one of its end surfaces a foam inlet opening coaxial with the shaft, for the supply to the rotor of foam in axial direction and on its opposite end surface an outlet opening coaxial with the shaft for the escape of gas separated from foam; a foam and liquid outlet opening formed by the starting and terminal longitudinal edges of the spiral housing and parts of the two end surfaces of said spiral housing; a foam inlet pipe connected to the foam inlet opening in the housing and adapted to be connected with the upper part of the container, for said axial supply of foam to the rotor; a gas outlet pipe connected to the gas outlet opening in the housing for the escape of gas separated from foam; a foam and liquid return pipe connected to the foam and liquid outlet opening in the housing, for passing the unseparated foam and the liquid resulting from splitting foam into the lower part of the container to a level substantially directly above the bottom of the container; a flat ring provided on the rotor adjacent the gas outlet opening in the housing in order to prevent escape of foam from the rotor through the outlet opening for the gas; the housing having a flange which is located opposite the flat ring of the rotor; the interior surface of said flange and the exterior surface of the flat ring being faced and said interior surface and exterior surface being spaced 0.5–2 mm. from each other in order to prevent escape of foam and liquid from the housing through the outlet opening for gas.

6. Apparatus as claimed in claim 5, in which the axial length of the radial rotor blades is greater than their radial width.

References Cited by the Examiner

UNITED STATES PATENTS

| 1,967,938 | 7/1934 | Jantzen et al. | 55—400 |
| 1,993,944 | 3/1935 | Peebles | 55—400 |
| 2,490,421 | 12/1949 | Denhard | 233—21 |
| 2,564,765 | 8/1951 | Mercier | 55—400 |

FOREIGN PATENTS

| 626,680 | 9/1961 | Canada. |
| 1,004,181 | 11/1951 | France. |
| 1,133,484 | 11/1956 | France. |
| 731,607 | 2/1943 | Germany. |
| 69,210 | 1/1952 | Netherlands. |

ALBERT T. MEYERS, *Primary Examiner.*

JOSEPH R. LIBERMAN, JULIUS GREENWALD,
*Examiners.*

R. D. EDMONDS, R. D. LOVERING,
*Assistant Examiners.*